United States Patent [19]

Fukuhara et al.

[11] Patent Number: 4,852,709
[45] Date of Patent: Aug. 1, 1989

[54] SYNCHRONIZING APPARATUS FOR A POWER TRANSMISSION

[75] Inventors: Yuichi Fukuhara, Toyoake; Tetsuo Ikeda, Chiryu, both of Japan

[73] Assignee: Aisin Seiki Kabushiki Kaisha, Japan

[21] Appl. No.: 174,437

[22] Filed: Mar. 28, 1988

[30] Foreign Application Priority Data

Mar. 31, 1987 [JP] Japan .................................. 62-078981

[51] Int. Cl.⁴ ............................................. F16D 23/06
[52] U.S. Cl. .................... 192/53 F; 192/53 G; 192/53 A; 192/48.91; 192/67 A
[58] Field of Search ................ 192/53 F, 53 G, 53 A, 192/48.91, 67 A

[56] References Cited

U.S. PATENT DOCUMENTS

| | | | |
|---|---|---|---|
| 3,035,674 | 5/1962 | Peras | 192/53 F |
| 3,779,352 | 12/1973 | Wörner | 192/53 F |
| 3,795,293 | 3/1974 | Wörner | 192/53 F |
| 3,962,930 | 6/1976 | Frazee | 74/473 R |
| 4,270,639 | 6/1981 | Johnsson | 192/53 F |
| 4,782,929 | 11/1988 | Müller | 192/53 F |

Primary Examiner—Leslie A. Braun
Assistant Examiner—Andrea Pitts
Attorney, Agent, or Firm—Finnegan, Henderson, Farabow, Garrett & Dunner

[57] ABSTRACT

A synchronizing apparatus for a power transmission comprises a shaft for rotation in response to a power source, a clutch hub fixed to the shaft for rotation therewith, the hub including an outer spline thereon; a sleeve including an inner spline for engaging the outer spline of the clutch hub, and having an inner frictional face radially outward from the inner spline; a gear rotatably mounted on the shaft including an outer spline surface having first and second grooves therein, and a circular groove between the first and second grooves; the spline surface also having a pair of adjoining sloped portions thereon, each having a different degree of slope; a synchronizing ring including an outer frictional surface for frictional contact with the inner frictional face, and an inner projection for engaging the outer spline surface of the gear and; a spring mounted in the circular groove for movement along the two sloped portions of the outer spline surface for biasing the ring toward the sleeve.

3 Claims, 6 Drawing Sheets

SYNCHRONIZING APPARATUS FOR A POWER TRANSMISSION

BACKGROUND OF THE INVENTION

1. Field of the Invention

The invention relates to synchronizing apparatus for a power transmission, for example, a synchronizing apparatus for a manual transmission of a vehicle.

2. Description of Prior Art

Prior art, for example, JAPAN TOKU-KOU-SHO No. 58-28606, is shown in FIGS. 9-14. In these FIGS., a portion of a power transmission apparatus is shown. In the neutral position shown in FIG. 9, spline 8 of a sleeve 1, spline 9 of a synchronized ring 3 and spline 10 of a gear 6 are axially arranged. A key 4 is held in position circularly by a clutch hub 2, radially by the sleeve 1 and a spring 5, and axially by the synchronizing ring 3.

In the shift condition shown in FIG. 10, spline 8 of sleeve 1 meshes with clutch hub 2, synchronizing ring 3 and gear 6. The length L in FIG. 10 must be less than a predetermined length, to prevent movement of key 4 in the direction of the arrow. Therefore, sleeve 1 must have a relatively long axial length. Sleeve 1, spline 8, key 4 and synchronizing ring 3 are substantially fixed radially.

A frictional cone face 7 on the gear 6 has a small diameter in comparison with the diameter of sleeve 1. Accordingly, frictional corn face 7 has a small power transmitting capability.

The prior art which is shown in FIG. 13 has a ring 51 in place of key 4 in FIG. 10. However, frictional cone face 54 in FIG. 13 also has a small diameter and small power transmitting capability. The prior art which is shown in FIG. 14 has two frictional cone faces 55. Therefore, the faces 55 have a larger power transmitting capability. However, the apparatus in FIG. 14 has many parts and is more expensive to manufacture.

SUMMARY OF THE INVENTION

An object of the present invention is to provide an improved synchronized apparatus for power transmission which can transmit more power on a given frictional cone face.

A further object of the present invention is to provide an improved synchronized apparatus for power transmission which has fewer parts.

To achieve the above objects and advantages, the synchronizing apparatus of the present invention comprises a shaft for rotation in response to a power source, a clutch hub fixed to the shaft for rotation therewith, the hub including an outer spline thereon; and sleeve means including an inner spline for engaging the outer spline of the clutch hub, and having an inner frictional face radially outward from the inner spline. Gear means are rotatably mounted on the shaft and include an outer spline surface having first and second grooves therein, and a circular groove between the first and second grooves; the spline surface also having a pair of adjoining sloped portions thereon, each having a different degree of slope.

The invention also includes synchronizing ring means including an outer frictional surface for frictional contact with the inner frictional face, and an inner projection for engaging the outer spline surface of the gear means; and spring means mounted in the circular groove for movement along the two sloped portions of the outer spline surface for biasing the ring means toward the sleeve means.

Preferably, the sloped portions include a step sloped portion adjacent to the circular groove and a more gradually sloped portion adjoining the steep sloped portion.

The clutch hub and the shaft also may be integral.

BRIEF DESCRIPTION OF THE DRAWINGS

FIG. 11 is an enlarged cross-sectional view of the splines of

FIG. 10, in an index-condition.

DETAILED DESCRIPTION OF THE INVENTION

Figure 1:
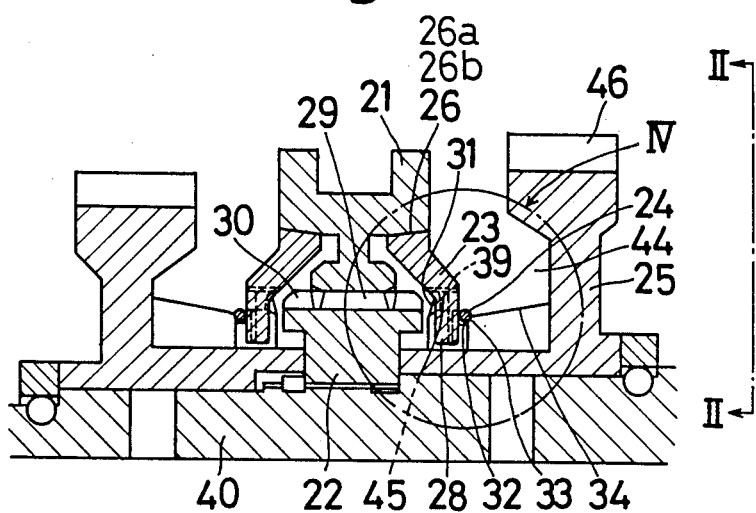
FIG. 1 is a cross sectional view which shows a preferred embodiment according to the present invention.
Figure 2:
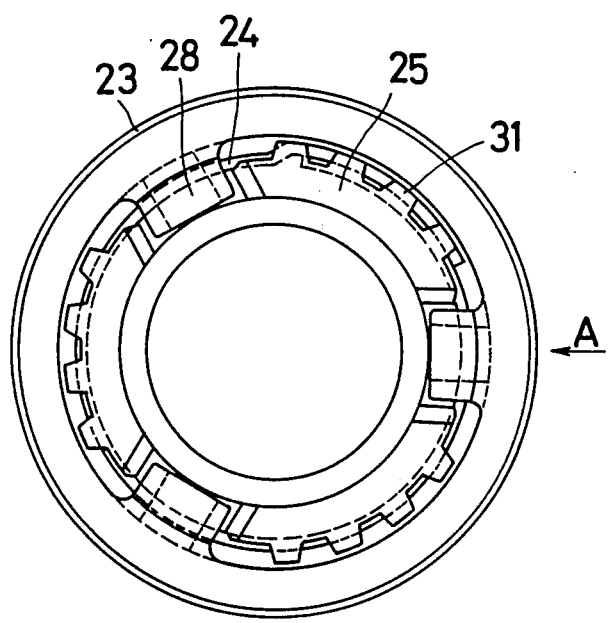
FIG. 2 is a front view which is taken along the line II—II in FIG. 1.

Referring to FIGS. 1 to 8, frictional cone faces 26 (26a, 26i b) are arranged on an outer surface of synchronized ring 23 and an inner surface of sleeve 21, respectively.

The synchronized ring 23 includes a plurality of projections 28, which project inwardly at spaced intervals around the circumference thereof. Gear 25 includes first grooves 27a (FIG. 6) in which the projections 28 are axially movable and are circularly or radially fixed, and second grooves 27b, into which the projections 28 loosely fit in the shift condition.

Sleeve 21 includes a spline 29, which is radially inside of frictional cone face 26a. The clutch hub 22 and the gear 25 also each include a spline. Spline 30 of the clutch hub 22 and spline 31 of the gear 25 are both radially inside of the frictional cone faces 26.

Figure 3:
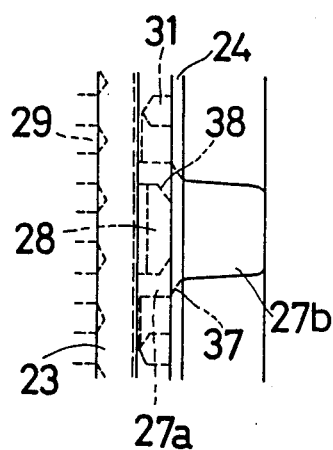
FIG. 3 is a side view which is taken from the direction indicated by the arrow III in FIG. 2.
Figure 4:
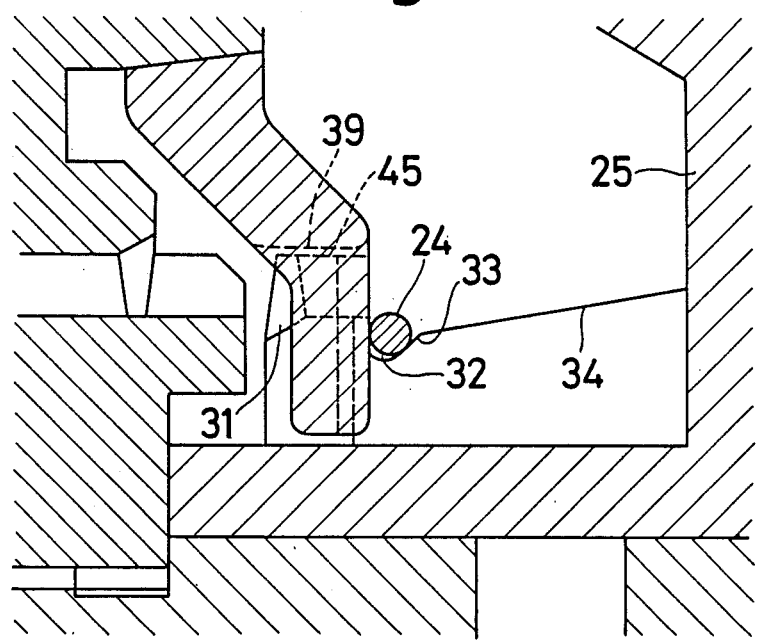
FIG. 4 is a enlarged cross-sectional view of a portion IV of FIG. 1.

The gear 25 includes a circular groove 32, a first cone face 33 and a second cone face 34 between the splines 46 and 31. A spring 24 is positioned radially outwardly in the circular groove 32. The first cone face 33 has a sharp slope, and the second cone face 34 has a more gradual slope. The gear 25 includes a slope face 37 between the first groove 27a and the second groove 27b. The synchronized ring 23 also includes a slope face 38 on one side, as shown in FIG. 3.

In the neutral condition (FIGS. 1 to 3), when the rotation of clutch hub 22 is different from the rotation of the gear 25, the sleeve 21 rotates with the clutch hub 22, and the synchronized ring 23 rotates with the gear 25. There is a gap between the frictional cone faces 26a, 26b. Therefore, frictional force does not occur on the faces 26.

In the shift control condition, when the sleeve 21 moves axially with respect to the gear 25, the sleeve 21 presses against the synchronized ring 23, and the synchronized ring 23 presses against the spring 24. Therefore, the spring 24 moves on the first cone face 33 and is axially expanded. This force of the spring 24 is transmitted to the frictional cone faces 26, and a frictional force is generated radially. Then, the projections 28 of the synchronized ring 23 come into contact with one side of the first grooves 27a (in FIG. 6).

Figure 5:
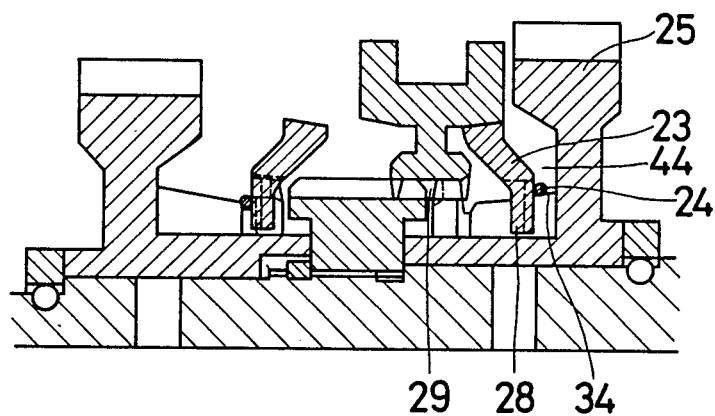
FIG. 5 is similar to FIG. 1 with sleeve 21 shifted to the right.
Figure 6:
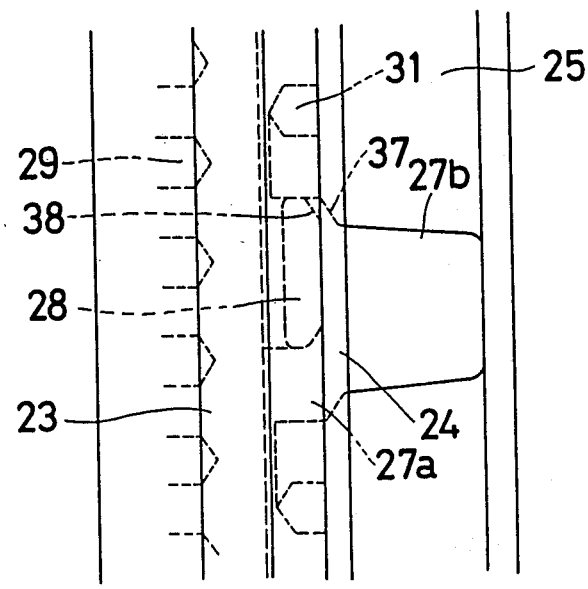
FIG. 6 is similar to FIG. 3 with the apparatus in an index-condition.
Figure 7:
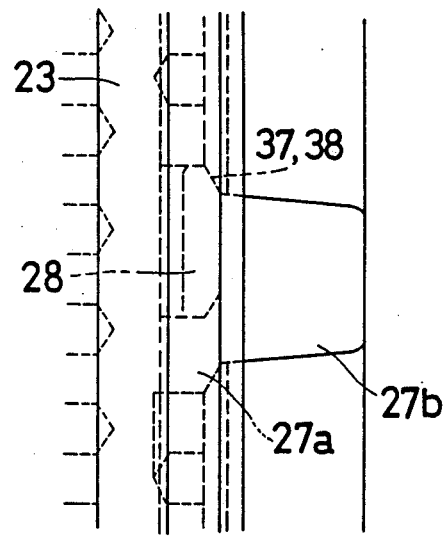
FIG. 7 is similar to FIG. 3 with the apparatus in a balk-condition.
Figure 8:
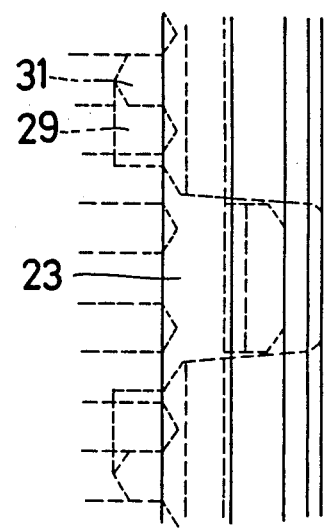
FIG. 8 is similar to FIG. 3 with the apparatus in a shift-completed condition.
Figure 9:
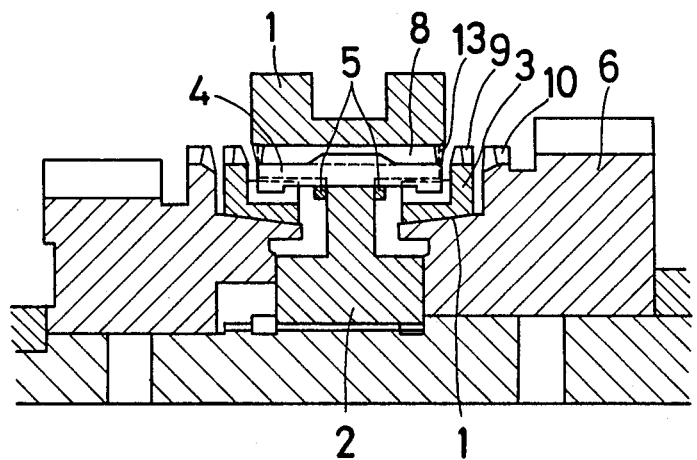
FIG. 9 is a cross sectional view of a prior art synchronizing apparatus.
Figure 10:
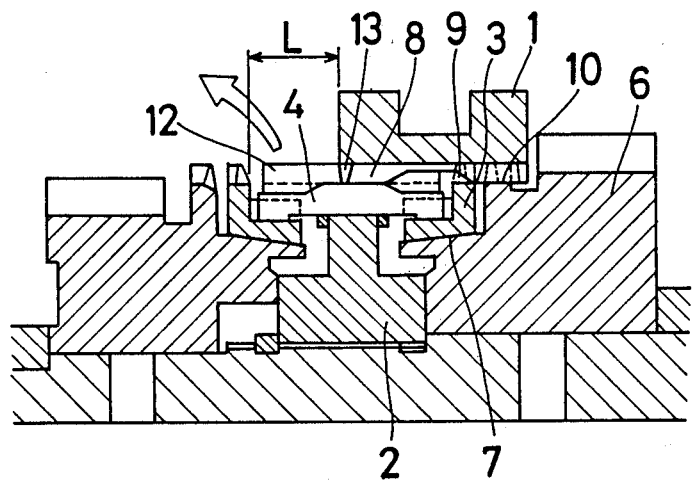
FIG. 10 is a similar view to FIG. 9 with sleeve 1 shifted to the right.
Figure 11:
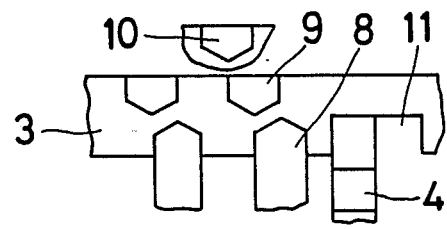
Figure 12:
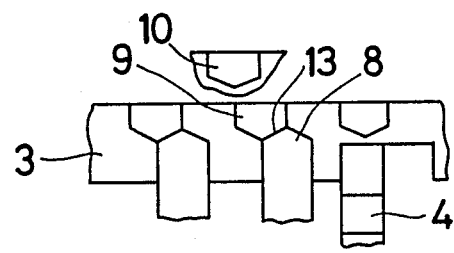
FIG. 12 is a similar view to FIG. 11 with the splines in a balk-condition.
Figure 13:
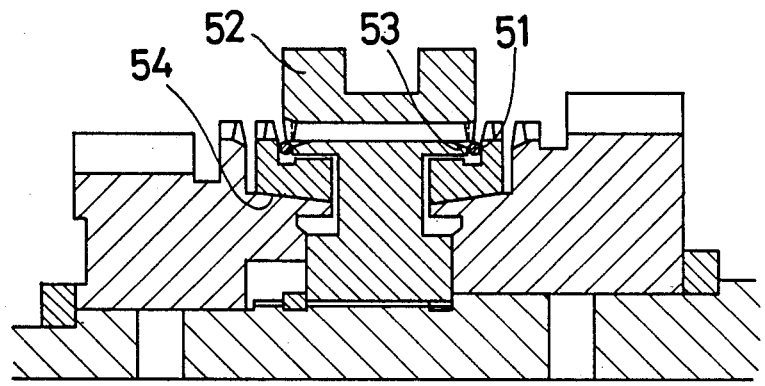
FIG. 13 is a cross sectional view of another prior art apparatus.
Figure 14:
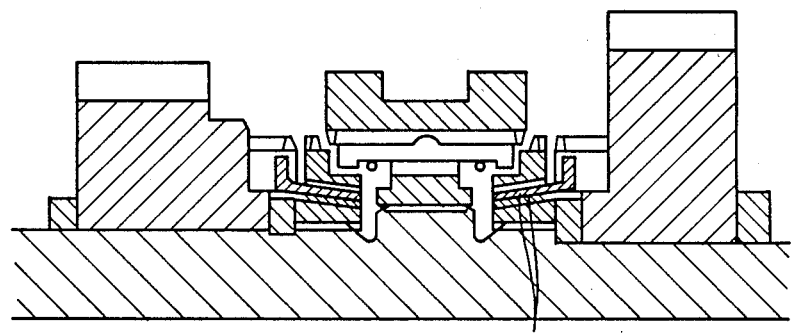
FIG. 14 is a cross sectional view of further prior art apparatus.

When further shift power is added, the sleeve 21, the synchronized ring 23, and spring 24 move axially with respect to the gear 25, and the spring 24 moves on the second cone face 34 (in FIG. 5). Therefore, the slope 38 of the projection 28 contacts the slope 37 between the first groove 27a and the second groove 27b (in FIG. 7).

When the rotation of the gear 25 is different from the rotation of the clutch hub 22, the frictional force on the frictional cone faces 26 is greater than the force between the slope 38 of the synchronized ring 23 and the slope 37 of the gear 25. Therefore, the synchronized ring 23 is prevented from moving axially with respect to the gear 25.

When the rotation of the gear 25 is similar to the rotation of the clutch hub 22, the synchronized ring 23 moves axially with respect to the gear 25, and the spline 29 of the sleeve 21 then engages wth the spline 31 of the gear 25. At this time, the shift to driving position is completed.

When the shift control is moved to the neutral position, the spline 29 of the sleeve 21 is separated from the spline 31 of the gear 25. Therefore, rotation occurs between the clutch hub 22 and the gear 25. The synchronized ring 23 is moved to the neutral position by the force of the spring 24.

In FIG. 1, the clutch hub 22 is engaged with the shaft 40. However, as another embodiment, the clutch hub 22 may be integrally formed with the shaft 40.

Various other modifications and variations may be made in the invention without departing from the scope or spirit of the invention.

What is claimed is:

1. A synchronizing apparatus for a power transmission, comprising:
    a shaft for rotation in response to a power source;
    a clutch hub fixed to the shaft for rotation therewith, the hub including an outer spline thereon;
    sleeve means including an inner spline for engaging the outer spline of the clutch hub, and having an inner frictional face radially outward from the inner spline;
    gear means rotatably mounted on the shaft including an outer spline surface having first and second grooves therein, and a circular groove between the first and second grooves; the spline surface also having a pair of adjoining sloped portions thereon, each having a different degree of slope;
    synchronizing ring means including an outer frictional surface for frictional contact with the inner frictional face, and an inner projection for engaging the outer spline surface of the gear means;
    spring means mounted in the circular groove for movement along the two sloped portions of the outer spline surface for biasing the ring means toward the sleeve means.

2. The apparatus of claim 1 wherein the sloped portions include a steep sloped portion adjacent to the circular groove and a more gradually sloped portion adjoining the steep sloped portion.

3. The apparatus of claim 2 wherein the clutch hub and the shaft are integral.

* * * * *